(12) United States Patent
Fujita (10) Patent No.: US 8,314,337 B2
(45) Date of Patent: Nov. 20, 2012

(54) GROMMET FOR WIRE HARNESS

(75) Inventor: Tetsuya Fujita, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 281 days.

(21) Appl. No.: 12/898,113

(22) Filed: Oct. 5, 2010

(65) Prior Publication Data
US 2011/0198110 A1    Aug. 18, 2011

(30) Foreign Application Priority Data

Feb. 15, 2010    (JP) ................................ 2010-030511

(51) Int. Cl.
*H01B 17/26* (2006.01)
(52) U.S. Cl. ............ 174/153 G; 174/152 G; 174/152 R; 16/2.1; 248/56
(58) Field of Classification Search ............ 174/152 G, 174/153 G, 152 R; 439/604; 16/2.1, 2.2; 248/56
See application file for complete search history.

(56) References Cited

U.S. PATENT DOCUMENTS

| | | | |
|---|---|---|---|
| 6,675,439 B2 * | 1/2004 | Hashimoto | 16/2.1 |
| RE38,788 E * | 9/2005 | Satou et al. | 16/2.1 |
| 7,709,755 B2 * | 5/2010 | Pfister | 174/668 |
| 2003/0014924 A1 | 1/2003 | Nakamura | |
| 2004/0206538 A1 | 10/2004 | Okuhara | |
| 2011/0011625 A1 | 1/2011 | Okuhara et al. | |

FOREIGN PATENT DOCUMENTS

| | | |
|---|---|---|
| EP | 1468877 | 10/2004 |
| JP | 56-76224 U | 6/1981 |
| JP | 7-14452 A | 1/1995 |
| JP | 8-195135 A | 7/1996 |
| JP | 9-213152 A | 8/1997 |
| JP | 11-63313 | 3/1999 |
| JP | 11-63313 A | 3/1999 |
| JP | 2001-258130 A | 9/2001 |
| WO | 2009/096036 | 8/2009 |

OTHER PUBLICATIONS

Search report from E.P.O., mail date is Jun. 10, 2011.

* cited by examiner

*Primary Examiner* — Dhirubhai R Patel
(74) *Attorney, Agent, or Firm* — Greenblum & Bernstein, P.L.C.

(57) ABSTRACT

In a grommet fitted around a wire harness wired in a vehicle, and mounted in a through hole of a vehicle body panel, a radially outward extending portion is provided on an outer peripheral surface at an end of a small diameter cylinder portion, in which the wire harness is tightly inserted. A large diameter cylinder portion is connected to an outer peripheral end of the radially outward extending portion. An annular stretchable portion is provided at a portion connecting the small diameter cylinder portion to the radially outward extending portion. A step is provided on an inner peripheral surface at a boundary position between the small diameter cylinder portion and the stretchable portion, such that a thickness of the stretchable portion is thinner than a thickness of the small diameter cylinder portion. An annular rib is provided on an outer peripheral surface of the boundary position. Radially extending restoring ribs are provided on a convex side surface of the stretchable portion circumferentially spaced in-between.

4 Claims, 7 Drawing Sheets

GROMMET FOR WIRE HARNESS

CROSS-REFERENCE TO RELATED APPLICATIONS

The present application claims priority under 35 U.S.C. §119 of Japanese Application No. 2010-030511, filed on Feb. 15, 2010, the disclosure of which is expressly incorporated by reference herein in its entirety.

BACKGROUND OF THE INVENTION

1. Field of the Invention

The present invention is related to a grommet for a wire harness, in particular, to a grommet, into which a wire harness to be wired in an automobile is inserted and which is mounted in a through hole of a vehicle body panel, having an improved following deformability and a restoring force after deformation of the grommet.

2. Description of Related Art

Conventionally, when a wire harness wired in an automobile is inserted into a through hole of a vehicle body panel, a grommet, into which the wire harness is inserted, is mounted in the through hole of the vehicle body panel, and thus, the grommet protects a portion of the wire harness W/H passing through the through hole, and prevents water and dust from entering.

Figure 5:
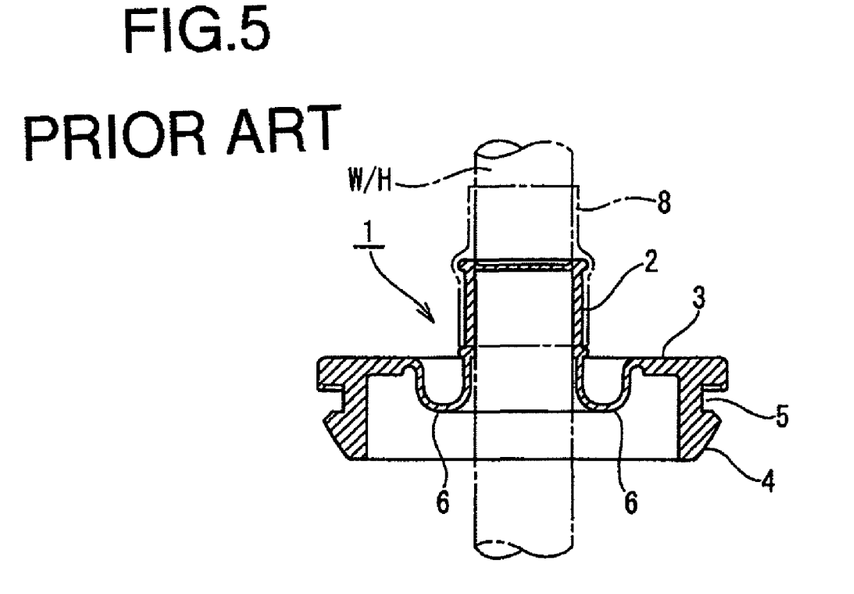
FIG. 5 is a cross-sectional view illustrating a conventional grommet.

FIG. 5 shows an example of a known grommet. The grommet 1 shown in FIG. 5 has a small diameter cylinder portion 2, in which a wire harness W/H is tightly inserted, and a large diameter cylinder portion 4, in which an annular recessed portion 5 to be engaged with a through hole of a vehicle body panel (not shown), is provided. The small diameter cylinder portion 2 and the large diameter cylinder portion 4 are connected in an axial direction via a radially outward extending portion 3. A stretchable portion 6, which has a U-shaped cross-section and extends toward the large diameter cylinder portion 4 side in parallel to the axial direction, is provided at a portion where the radially outward extending portion 3 is connected to the small diameter cylinder portion 2. After the wire harness W/H is inserted into the grommet, an adhesive tape 8 for fixing the wire harness is wound around a portion from an outer peripheral surface of the wire harness, which is pulled out from the small diameter cylinder portion 2, to an outer peripheral surface of the small diameter cylinder portion 2, to fix them to each other.

Figure 6A:
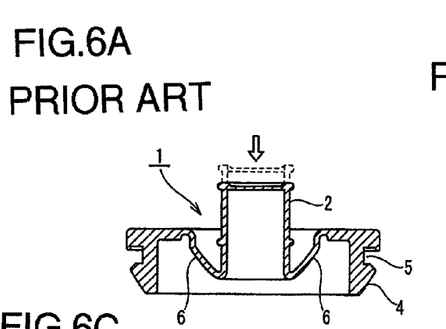
Figure 6B:
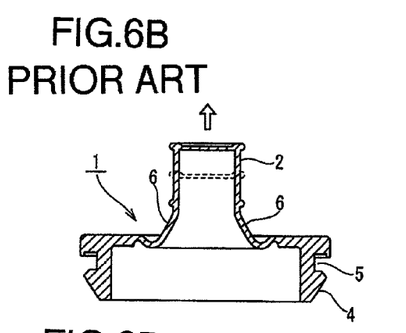
FIG. 6B is a cross-sectional view illustrating a state when the grommet is pulled.
Figure 6C:
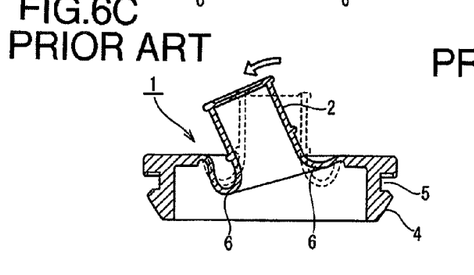
FIG. 6C is a cross sectional view illustrating a state when the grommet is bent.

When the grommet 1 is mounted into the through hole of the vehicle body, the grommet is pushed into the through hole, receives a pulling external force, and further receives a twisting or skewing external force. However, as shown in FIGS. 6A, 6B and 6C, the stretchable portion 6 follows the external force by compressing, stretching and bending, thereby absorbing the external force. Thus, the stretchable portion 6 prevents the large diameter cylinder portion 4 having the annular recessed portion 5 from receiving the external force. Accordingly, the annular recessed portion 5 is not separated from the through hole, and a gap between the through hole and the annular recessed portion 5 is not generated.

However, since the stretchable portion 6 is required to have a flexible deformability, the thickness of the stretchable portion 6 is thin and a restoring force after the deformation is weak. In particular, the grommet 1 is difficult to be restored after stretching or compressing deformation in the axial direction of the grommet 1. Therefore, the wiring path of the harness may be changed thereby. Further, the wire harness may interfere with other components, or a working space may be reduced due to the change in the wiring path.

Figure 7A:
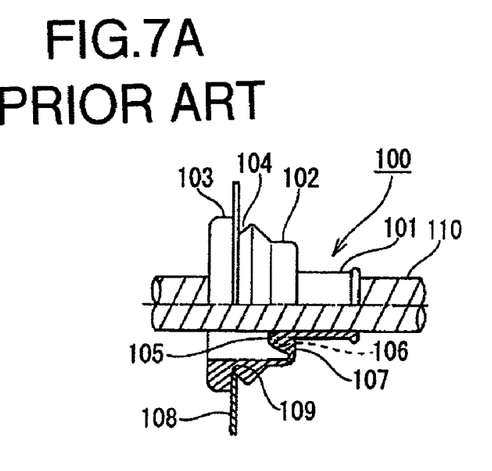
FIG. 7A is a side elevational view (partial cross-sectional view)
Figure 7B:
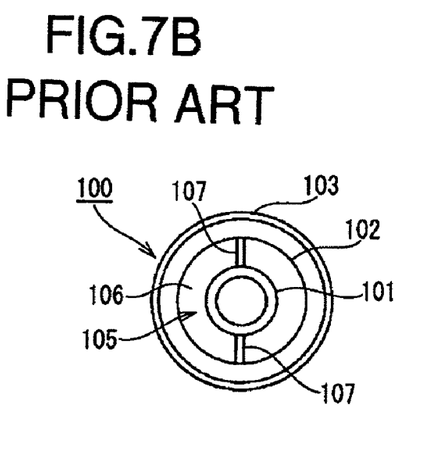
FIG. 7B is a front elevational view.

In view of the above circumstances, Japanese Patent Application Publication No. 11-63313 discloses a grommet 100 as shown in FIGS. 7A and 7B. The grommet 100 has a small diameter cylinder portion 101, into which a wire harness 110 is tightly inserted, and a large diameter cylinder portion 103, in which an annular recessed portion 104 to be engaged with a through hole 109 of a vehicle body panel 108 is provided. The small diameter cylinder portion 101 and the large diameter cylinder portion 103 are connected via a circumferential wall portion 102. A stretchable portion 105, which extends toward the large diameter cylinder portion 103 side in parallel with an axial direction of the grommet 100, is provided at a portion where the circumferential wall portion 102 is connected to the small diameter cylinder portion 101. Reinforcing ribs 107 are provided in a concave portion 106 of the stretchable portion 105 on the small diameter cylinder portion 101 side, to connect between two side wall inner surfaces of the concave portion 106.

According to the grommet 100, a restoring force of the stretchable portion 105 after deformation is expected to be increased by the reinforcing ribs 107. However, the reinforcing ribs 107 restrict a stretching-and-compressing deformation of the stretchable portion 105 in the axial direction. Therefore, when the grommet 100 is inserted into the through hole 109, following deformability of the grommet 100 is reduced, and the insertion force into the through hole is not reduced. Further, a holding force to maintain the grommet 100 in the through hole is likely to be reduced.

Figure 6D:
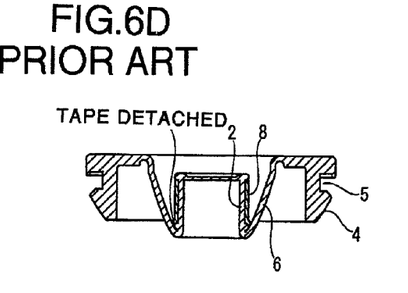
FIG. 6D is a view illustrating a state when an adhesive tape for fixing the wire harness is detached from the grommet.

Further, in the grommet shown in FIG. 5, when the deformation amount of the stretchable portion 6 increases, the adhesive tape 8 for fixing the wire harness, which is wound around a portion from the outer peripheral surface of the small diameter cylinder portion 2 to the outer peripheral surface of the wire harness W/H, is likely to be detached from an end portion, as shown in FIG. 6D. When the adhesive tape 8 is once detached, even if the stretchable portion 6 is restored to its original shape, the tape still remains detached, and the fixing force is weakened. Therefore, the positional displacement may occur in the mounting positions of the wire harness and the grommet. Further, when the operator grasps the grommet, the adhesive surface of the detached tape may stick to the operator's hand, and the detached tape may be completely separated from the grommet.

SUMMARY OF THE INVENTION

In view of the above-described circumstances, the present invention provides a grommet for a wire harness, having a following deformability with respect to a push-in force or a pulling force applied to the grommet when the grommet is mounted in a through hole of a vehicle body, and in which a restoring force after the following deformation is improved, such that the grommet is mounted in and held by the through hole in a right posture.

An aspect of the present invention provides a grommet which is fitted around a wire harness wired in a vehicle, mounted in a through hole of a vehicle body panel, and molded with a rubber or an elastomer. The grommet includes: a small diameter cylinder portion, in which the wire harness is tightly inserted; a radially outward extending portion provided on an outer peripheral surface at an end of the small diameter cylinder portion; a large diameter cylinder portion connected to an outer peripheral end of the radially outward extending portion; an annular vehicle body engaging recessed portion provided in an outer peripheral surface of the large diameter cylinder portion; and an annular stretchable portion provided at a portion connecting the small diameter cylinder portion to the radially outward extending portion. The stretchable portion extends in a direction same as a direction in which the large diameter cylinder portion extends and is then folded backward, to form a U-shape. A step is provided at a boundary position between an inner peripheral surface of the small diameter cylinder portion and a convex side surface of the stretchable portion, such that a thickness of the stretchable portion is thinner than a thickness of the small diameter cylinder portion. An annular rib is provided on an outer peripheral surface of the boundary position. Radially extending restoring ribs are provided on the convex side surface of the stretchable portion circumferentially spaced in-between.

Thus, the restoring ribs are provided on the convex side surface that extends in a hollow portion surrounded by the large diameter cylinder portion, instead of on the outer surface of the concave portion side of the stretchable portion being folded backward in U-shape. Therefore, the stretchable portion can have an excellent stretching-and-compressing deformability in an axial direction, in addition to a radial direction of the grommet. Further, the restoring ribs make the stretchable portion partially thicker, thereby increasing a restoring force of the stretchable portion after the deformation. Accordingly the grommet has an excellent following deformability with respect to the pulling, pushing and bending performed during a mounting operation of the grommet into the through hole in the vehicle body, or the like. Thus, a mounting operability of the grommet into the through hole in the vehicle body can be improved. At the same time, the stretchable portion does not remain in the stretched or compressed state after the following deformation, and is quickly restored to the original shape. Accordingly, the wire harness is prevented from interfering with the other components mounted on the vehicle due to the change in the path of the wire harness. Further, reduction in a work space is also prevented.

Further, at the boundary position between the thick small diameter cylinder portion and the thin stretchable portion, the step is provided in the inner periphery, and the annular rib is provided on the outer periphery. Thus, rigidity of the boundary position is increased both from inside and outside. As a result when the stretchable portion is pushed in, resistance is generated at the boundary position, and thereby a push-in amount of the stretchable portion can be restricted. Further, since the width of the annular rib provided on the outer periphery should be flipped at once without stopping, this width also generates resistance. Moreover, the annular rib on the outer periphery protects an end portion of the adhesive tape for fixing the wire harness, which is wound around an area from the outer periphery of the small diameter cylinder portion to the outer periphery of the wire harness. Accordingly, even if the stretchable portion is pushed in, the tape is prevented from being detached, since the adhesive tape does not extend to the stretchable portion.

As described above, the thickness of the stretchable portion may preferably be thinner than the thickness of the small diameter cylinder portion. The extending height of the restoring rib may preferably be a height that the restoring rib does not extend inwardly to exceed the inner peripheral surface of the small diameter cylinder portion. The thickness of the outer peripheral portion of the radially outward extending portion and the large diameter cylinder portion may preferably be between double and quadruple the thickness of the stretchable portion.

Thus, since the extending height of the restoring rib is set to a height that the restoring rib does not extend to exceed the inner peripheral surface of the small diameter cylinder portion, the wire harness can be more easily inserted into the small diameter cylinder portion and the interference between the restoring ribs and the wire harness can be prevented.

Further, since the thickness of the stretchable portion is thinner than the thickness of the small diameter cylinder portion, the stretchable portion has an excellent following deformability. In addition, since the thickness of the outer peripheral portion of the radially outward extending portion and the large diameter cylinder portion, which are positioned around the vehicle body engaging recessed portion, is between double and quadruple the thickness of the stretchable portion, it is possible to achieve a good balance between the following deformability and an excellent mounting force to the through hole.

When the thickness of the outer peripheral portion of the radially outward extending portion and the large diameter cylinder portion is less than double of the thickness of the stretchable portion, the thickness of the stretchable portion is too thick and the stretching-and-compressing deformability decreases, or the thicker portion is too thin and the mounting force to the through hole decreases. On the other hand, when the thickness of the outer peripheral portion of the radially outward extending portion and the large diameter cylinder portion is more than quadruple the thickness of the stretchable portion, the thickness of the stretchable portion is too thin and the restoring force of the restoring rib does not function sufficiently, or the thicker portion is thicker than necessary and the cost and weight of the grommet are likely to increase.

An area of the restoring ribs may be 5 to 25% of a circular projected area, which is formed by projecting the convex side surface of the stretchable portion from a front. By setting the area of the restoring ribs within this range, the stretchable portion can have both the stretching deformability and the restoring force in a balanced manner. Each restoring rib may preferably have a width of 1 mm-9 mm, and the number of restoring ribs may preferably be between 3 and 16. Further, the width of the annular rib, provided on the outer peripheral surface of the boundary between the stretchable portion and the small diameter cylinder portion, may preferably be 1 mm-6 mm.

As described above, the grommet according to the present invention has the stretchable portion having a U-shape cross-section provided at a portion where the small diameter cylinder portion is connected to the radially outward extending portion, and the radially extending restoring ribs provided on the convex side surface of the stretchable portion circumferentially spaced in-between. Accordingly, the restoring force after deformation can be improved without reducing the deformability of the stretchable portion.

Therefore, even when an external force, such as pulling, push-in, bending, or the like, is applied to the grommet during the operation of mounting the grommet into a through hole in the vehicle body, the following deformation of the stretchable portion prevents the vehicle body engaging portion from being deformed, and an excellent mounting force to the through hole can be provided. In addition, the stretchable portion does not remain in a stretched or compressed state, and is immediately restored by the restoring ribs. Accordingly, the wire harness is prevented from changing its path, and from interfering with the other components mounted on the vehicle thereby. Further, a reduction in a work space is also prevented.

Further, at the boundary position between the small diameter cylinder portion and the stretchable portion, a step and an annular rib are respectively provided on the inner surface side and on the outer surface side, to increase the rigidity at the boundary position. Therefore, the push-in amount of the stretchable portion can be restricted, and the adhesive tape for fixing the wire harness, which is wound around the area from the outer peripheral surface of the small diameter cylinder portion to the outer peripheral surface of the wire harness, is prevented from being detached from the end portion.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1A, 1B and 1C show a grommet according to an embodiment of the present invention, in which.

FIGS. 3A, 3B and 3C show stretching-and-compressing deformation of the grommet, when the grommet is being mounted in the through hole of a vehicle body, in which FIG. 3A is a cross-sectional view showing a state when the grommet is pushed in.

FIGS. 6A-6D illustrate deformation of the grommet shown in FIG. 5, in which FIG. 6A is a cross-sectional view illustrating a state when the grommet is pushed in; FIGS. 7A and 7B illustrate another conventional grommet, in which

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1A:
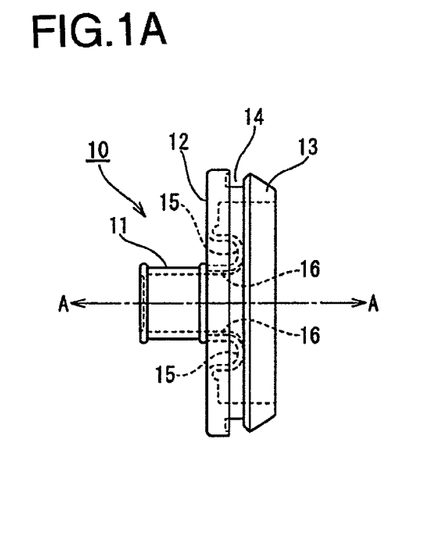
FIG. 1A is a side elevational view.
Figure 1B:
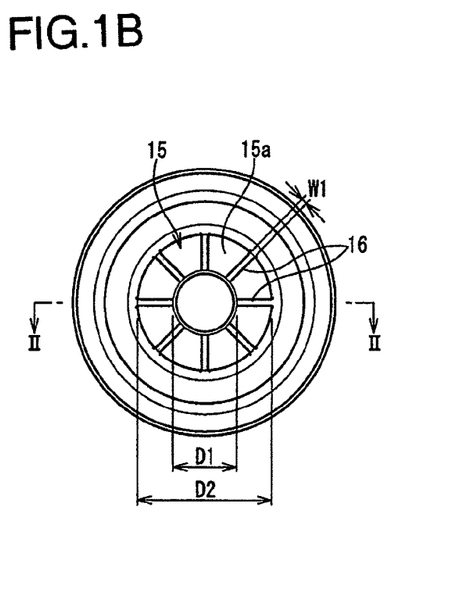
FIG. 1B is a front elevational view.
Figure 1C:
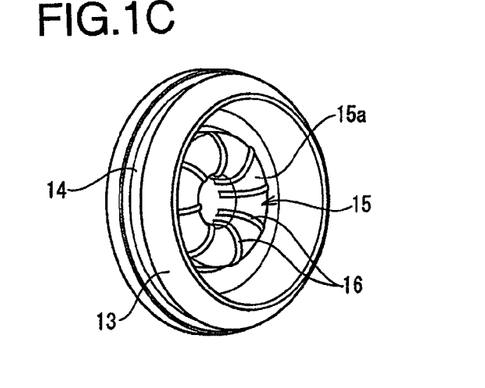
FIG. 1C is a perspective view.
Figure 2A:
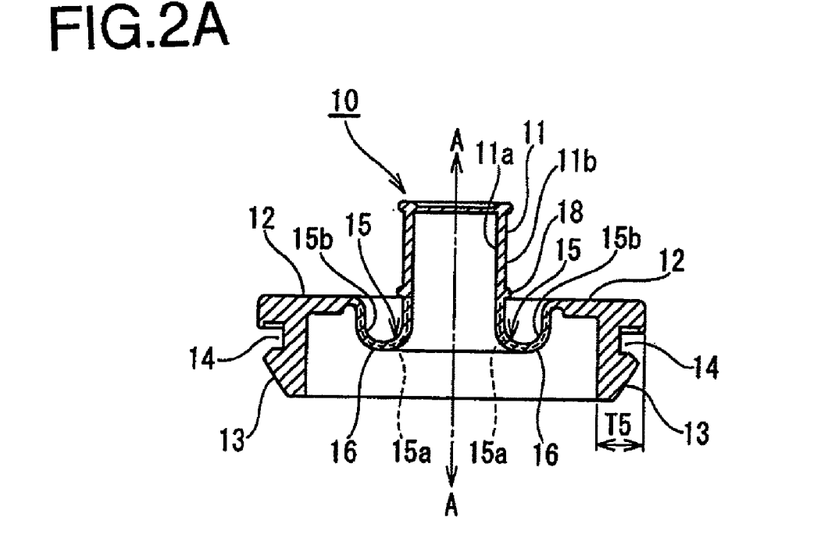
FIG. 2A is a cross-sectional view of the grommet taken along the line II-II of FIG. 1B.
Figure 2B:
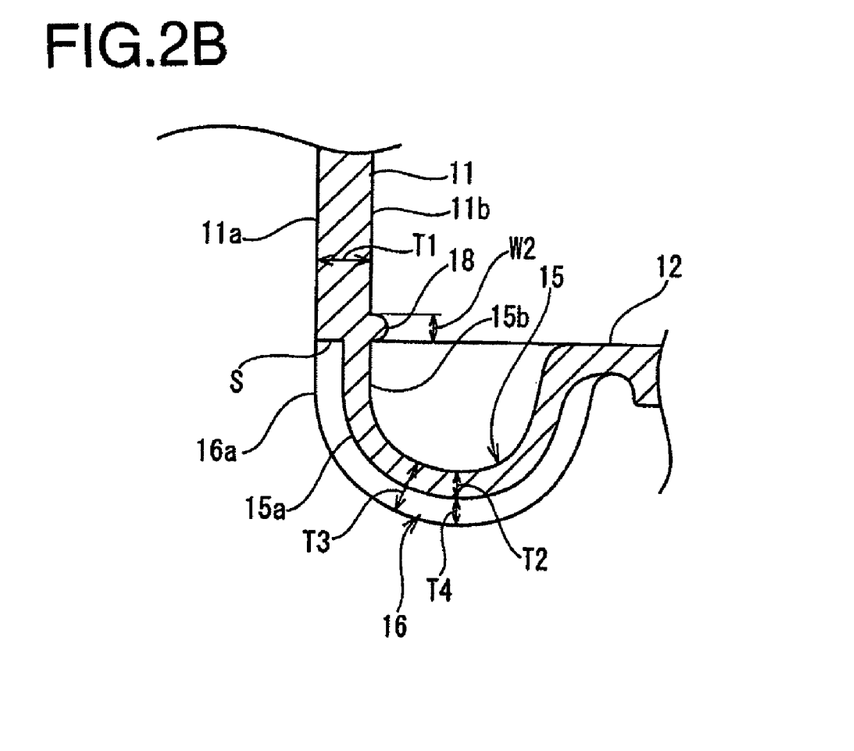
FIG. 2B is an enlarged cross-sectional view illustrating a main portion of FIG. 2A.
Figure 3A:
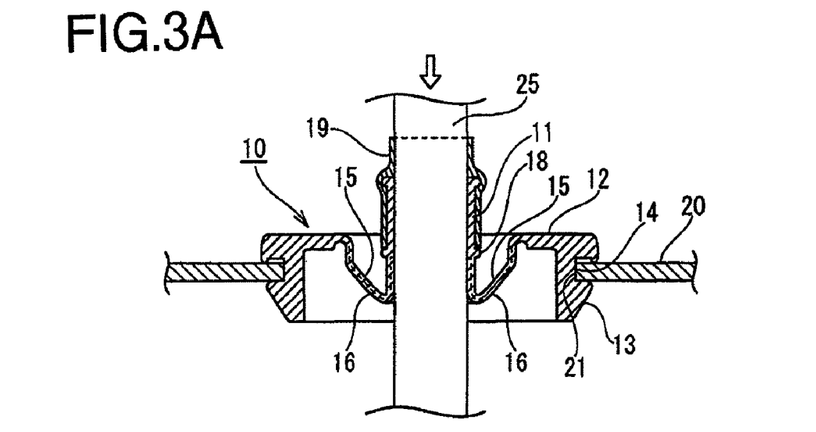
Figure 3B:
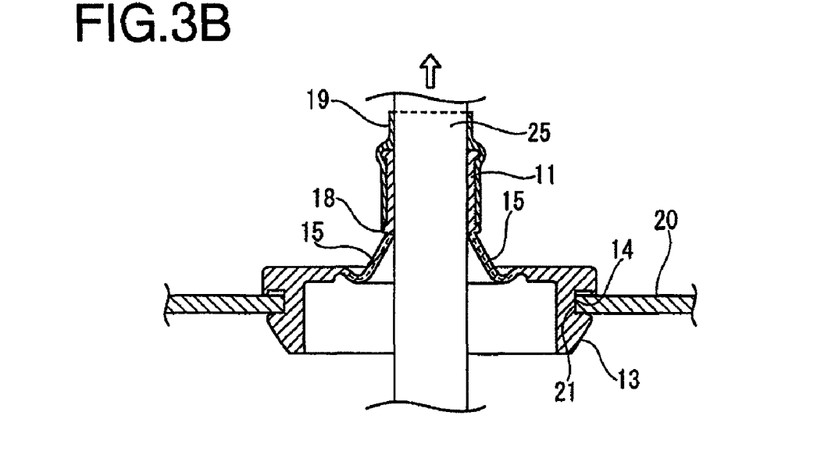
FIG. 3B is a cross-sectional view showing a state when the grommet is pulled.
Figure 3C:
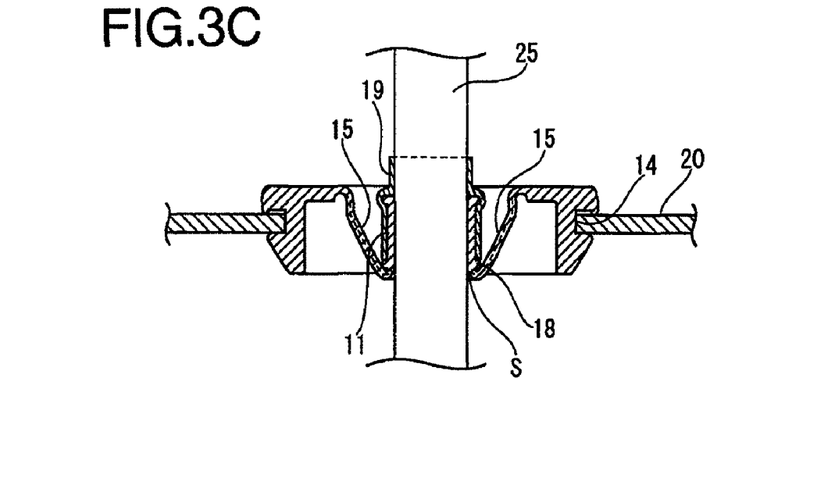
FIG. 3C is a cross-sectional view showing a state when the grommet is pressed.

Embodiments of the present invention will be described hereinafter with respect to the drawings. FIGS. 1-3 illustrate a grommet 10 according to an embodiment of the present invention. The grommet 10 is fitted around a wire harness 25 to be inserted into a through hole 21 provided in a vehicle body panel 20 of an automobile, and is mounted in the through hole 21.

As shown in FIGS. 1A-1C and FIG. 2A, the grommet 10 includes a small diameter cylinder portion 11, into which the wire harness 25 is tightly inserted; a radially outward extending portion 12, which extends from an outer peripheral surface at an end of the small diameter cylinder portion 11; a large diameter cylinder portion 13, which extends from an outer peripheral end of the radially outward extending portion 12. The small diameter cylinder portion 11, the radially outward extending portion 12 and the large diameter cylinder portion 13 are connected in an axial direction A, and are integrally formed of any suitable elastic material, such as a rubber or an elastomer. An annular vehicle body engaging recessed portion 14, which engages with a rim of the through hole 21, is provided in an outer peripheral surface of the large diameter cylinder portion 13.

An annular stretchable portion 15 is provided at a portion connecting the small diameter cylinder portion 11 to the radially outward extending portion 12. The stretchable portion 15 extends toward the large diameter cylinder portion 13 side in parallel with the axial direction A, and is folded backward to form a U-shape. Further, the stretchable portion 15 continues in a circumferential direction to bulge annularly. As shown in FIG. 2B, a step S is provided at a boundary position between an inner peripheral surface of the small diameter cylinder portion 11 and a convex side surface 15a of the stretchable portion 15. Thickness T2 of the stretchable portion 15 is thinner than thickness T1 of the small diameter cylinder portion 11. Further, an annular rib 18 is provided on an entire outer periphery of the boundary position between the small diameter cylinder portion 11 and the concave side surface 15b of the stretchable portion 15. Width W2 of the annular rib may be any suitable size, such as 1 mm-4 mm. In addition, eight restoring ribs 16 are provided to extend from a convex side surface 15a of the stretchable portion 15 equiangularly. Each restoring rib 16 radially extends the entire length of the convex side surface 15a in the radial direction and is curved into a U-shape.

As shown in FIG. 1B, the annular stretchable portion 15 has an inner diameter D1 of 18 mm and an outer diameter D2 of 75 mm. On the other hand, width W1 of the restoring rib 16 is such as 2 mm. Accordingly, the total area of the restoring rib 16 is 8.5% of the total area of the convex side surface 15a of the stretchable portion 15, in a frontal projected area.

Further as shown in FIG. 2B, thickness (extending height) T4 of the restoring rib 16 extending from the stretchable portion 15 is set such that an extending end 16a of the restoring rib 16 does not exceed an inner peripheral surface 11a of the small diameter cylinder portion 11. In other words, total thickness T3, which is a sum of T2 and T4, is substantially equal to the thickness T1 of the small diameter cylinder portion 11.

Thickness T5 of the outer peripheral portion of the radial outward extending portion 12 and the large diameter cylinder portion 13 is set within a range between double to quadruple the thickness T2 of the stretchable portion 15.

Thus, the grommet 10 as constructed above has the restoring ribs 16 on the convex side surface 15a of the stretchable portion 15, instead of on the concave side surface 15b. Therefore, restoring force after deformation can be improved without impairing (or reducing) stretching-and-compressing deformability of the stretchable portion 15. Further, the thickness T2 of the stretchable portion 15 is set to be equal to or slightly thinner than the thickness T1 of the small diameter cylinder portion 11, and the projected area of the restoring ribs 16 is set to be 8.5%, i.e., within the range between 5% and 25% of the total projected area of the convex side surface 15a of the stretchable portion 15. Therefore, it is possible to achieve a good balance between the stretching-and-compressing deformability and the restoring force of the stretchable portion 15.

While the small diameter cylinder portion 11 of the grommet 10 is being expanded by an expanding jig (not shown), the wire harness 25 is inserted into the grommet 10 along the axis thereof. After the insertion, an adhesive tape 19 for fixing the wire harness is wound around a portion from an outer peripheral surface of the small diameter cylinder portion 11 to an outer peripheral surface of the wire harness 25, which is pulled out from an end of the small diameter cylinder portion 11, to fix the wire harness 25 to the grommet 10. An end of the adhesive tape 19 reaches the position of the annular rib 18.

When the wire harness 25 is wired in the vehicle body and the wire harness 25 is inserted in the through hole of the vehicle body 20, the grommet 10, attached to the wire harness 25, is pressed into and pulled out of the through hole, to mount the grommet 10 in the through hole of the vehicle body. At this time, the grommet 10 receives an external force in a pressing direction as shown in FIG. 3A, as well as an external force in a pulling direction as shown in FIG. 3B. When the grommet 10 receives such an external force, as shown in FIGS. 3A and 3B, the stretchable portion 15 can be compressed or stretched to absorb such external forces. Further, even when the similar external forces are applied to the grommet 10 after the grommet 10 is mounted on the vehicle body, the stretchable portion 15 can be similarly deformed to absorb the external force. Therefore, it is possible to prevent the external forces from being applied to the large diameter cylinder portion 13, and thus to prevent disengagement of the vehicle body engaging recessed portion 14 from the through hole 21, formation of a gap between the vehicle body engaging recessed portion 14 and the through hole 21, or the like. In addition, when the grommet 10 stops receiving the external forces, the restoring ribs 16 start functioning and thus the stretchable portion 15 is immediately restored to its original state without remaining in a compressed state or stretched state. Therefore, the wire harness 25 is prevented from changing its path or interfering with other components mounted on the vehicle thereby. Further, a reduction in a work space is also prevented.

In particular, as shown in FIG. 3C, the boundary position between the stretchable portion 15 and the small diameter cylinder portion 11 is reinforced both from inside and outside by providing the step S on the inner surface and the annular rib 18 on the outer surface at the boundary position. Therefore, even if the force to push the stretchable portion 15 into the hollow portion in the large diameter cylinder portion 13 is increased, the boundary position resists a force to deform the small diameter cylinder portion 11. Thus, an end portion of the small diameter cylinder portion 11, where the annular rib 18 is provided, is not deformed to bend outwardly. Accordingly, the adhesive tape 19 for fixing the wire harness, which is wound around the outer peripheral surface of the small diameter cylinder portion 11 up to the position of the annular rib 18, is securely prevented from being detached from the end. As a result, the adhesive tape 19 can maintain the grommet 10 and the wire harness 25 being fixed to each other without causing a positional displacement.

Further, the thickness T5 of the outer peripheral portion of the radially outward extending portion 12 and the large diameter cylinder portion 13, i.e., the thickness of a portion adjacent to the vehicle body engaging recessed portion 14, is set within the range from double to quadruple the thickness T2 of the stretchable portion 15. Accordingly, the grommet 10 provides an excellent followability to the deformation caused by a harness handling operation, or the like, and a strong mounting force to the through hole 21 in a balanced manner.

Further, the extending ends 16a of the restoring ribs 16 do not extend inwardly to exceed the inner peripheral surface 11a of the small diameter cylinder portion 11. Therefore, the interference between the wire harness 25, which is inserted into the small diameter cylinder portion 11, and the restoring ribs 16 can be avoided.

Figure 4:
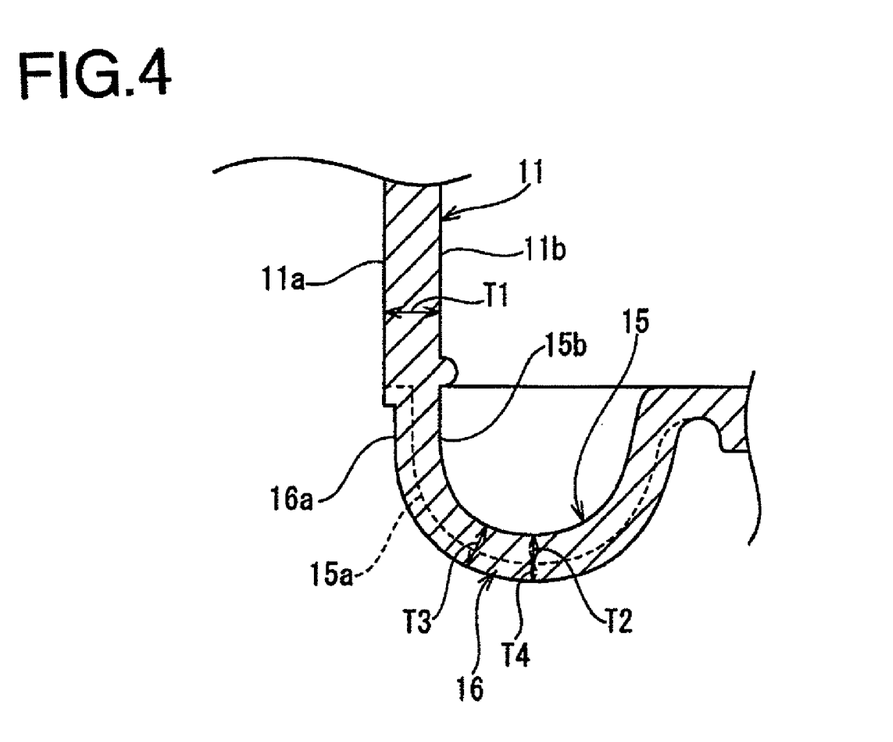
FIG. 4 is an enlarged cross-sectional view illustrating a main portion of a modified embodiment of the present invention.

As shown in a modified embodiment in FIG. 4, the thickness T3, which is a sum of the thickness T2 of the stretchable portion 15 and the thickness T4 of the restoring rib 16, may be thinner than the thickness T1 of the small diameter cylinder portion 11. In this case, the extending end 16a of the restoring rib 16 is indented outwardly from the inner peripheral surface 11a of the small diameter cylinder portion 11, so as to form a step.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A grommet configured to be fitted around a wire harness and mounted in a through hole of a vehicle body panel, the grommet comprising:
   a small diameter cylinder portion in which the wire harness is tightly inserted;
   a radially outward extending portion provided on an outer peripheral surface at an end of the small diameter cylinder portion;
   a large diameter cylinder portion connected to an outer peripheral end of the radially outward extending portion;
   an annular vehicle body engaging recessed portion provided in an outer peripheral surface of the large diameter cylinder portion;
   an annular stretchable portion provided at a portion connecting the small diameter cylinder portion to the radially outward extending portion, the stretchable portion extending in a direction same as a direction in which the large diameter cylinder portion extends and then being folded backward to have a U-shape;
   a step provided at a boundary position between an inner peripheral surface of the small diameter cylinder portion and a convex side surface of the stretchable portion, such that a thickness of the stretchable portion is thinner than a thickness of the small diameter cylinder portion,
   an annular rib provided on an outer peripheral surface of the boundary position; and
   radially extending restoring ribs provided on the convex side surface of the stretchable portion circumferentially spaced in-between.

2. The grommet for the wire harness according to claim 1, wherein an extending height of the restoring ribs is set such that the restoring ribs do not exceed the inner peripheral surface of the small diameter cylinder portion, and a thickness of an outer peripheral portion of the radially outward extending portion and the large diameter cylinder portion is set between double and quadruple the thickness of the stretchable portion.

3. The grommet for the wire harness according to claim 2, wherein an area of the restoring ribs is 5 to 25% of a circular projected area, which is formed by projecting the convex side surface of the stretchable portion from a front view.

4. The grommet for the wire harness according to claim 1, wherein an area of the restoring ribs is 5 to 25% of a circular projected area, which is formed by projecting the convex side surface of the stretchable portion from a front view.

* * * * *